(12) United States Patent
Song et al.

(10) Patent No.: US 11,451,280 B2
(45) Date of Patent: Sep. 20, 2022

(54) METHOD AND DEVICE OF TRANSMITTING AND RECEIVING CHANNEL STATE INFORMATION REPORT

(71) Applicant: VIVO MOBILE COMMUNICATION CO.,LTD., Guangdong (CN)

(72) Inventors: Yang Song, Chang'an Dongguan (CN); Peng Sun, Chang'an Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 145 days.

(21) Appl. No.: 16/969,966

(22) PCT Filed: Jan. 28, 2019

(86) PCT No.: PCT/CN2019/073401
§ 371 (c)(1),
(2) Date: Aug. 13, 2020

(87) PCT Pub. No.: WO2019/157941
PCT Pub. Date: Aug. 22, 2019

(65) Prior Publication Data
US 2020/0412430 A1    Dec. 31, 2020

(30) Foreign Application Priority Data
Feb. 14, 2018   (CN) .......................... 201810152163.X (51) Int. Cl.
*H04W 72/04* (2009.01)
*H04B 7/06* (2006.01)
(Continued)

(52) U.S. Cl.
CPC ......... *H04B 7/0626* (2013.01); *H04L 5/0051* (2013.01); *H04W 72/042* (2013.01); *H04W 72/0453* (2013.01); *H04W 80/02* (2013.01)

(58) Field of Classification Search
None
See application file for complete search history.

(56) References Cited

U.S. PATENT DOCUMENTS

2013/0315185 A1   11/2013   Kim et al.
2017/0195028 A1   7/2017   Shimezawa et al.
(Continued)

FOREIGN PATENT DOCUMENTS

| CN | 103313294 A | 9/2013 |
| CN | 106465374 A | 2/2017 |
| CN | 107079323 A | 8/2017 |

OTHER PUBLICATIONS

Written Opinion and International Search Report in Application No. PCT/CN2019/073401 dated Aug. 27, 2020.

*Primary Examiner* — Edan Orgad
*Assistant Examiner* — Emmanuel K Maglo
(74) *Attorney, Agent, or Firm* — Maschoff Brennan (57) ABSTRACT

A method of transmitting a CSI report is provided. The method includes: receiving a first indication on a second DL frequency domain transmission resource, the first indication is used to activate a first DL frequency domain transmission resource; transmitting a CSI report on a first UL frequency domain transmission resource according to a first CSI report configuration corresponding to the first DL frequency domain transmission resource when it is determined that there is the first CSI report configuration and it is determined that a CSI-RS corresponding to the first CSI report configuration is received on the first DL frequency domain transmission resource, wherein the first CSI report configuration includes a periodicity characteristic of the CSI report.

20 Claims, 4 Drawing Sheets

(51) Int. Cl.
    *H04L 5/00*     (2006.01)
    *H04W 80/02*     (2009.01)

(56) References Cited

U.S. PATENT DOCUMENTS

| | | |
|---|---|---|
| 2017/0250781 A1 | 8/2017 | Golitschek Edler Von Elbwart et al. |
| 2019/0141546 A1* | 5/2019 | Zhou .................. H04W 72/1294 |
| 2019/0149291 A1* | 5/2019 | Xiong .................. H04L 5/0055 370/329 |
| 2019/0149305 A1* | 5/2019 | Zhou .................... H04L 1/0026 370/330 |
| 2019/0150172 A1* | 5/2019 | Ang .................. H04W 72/1231 370/329 |
| 2019/0199420 A1* | 6/2019 | Faxér .................... H04B 7/0632 |
| 2019/0207662 A1* | 7/2019 | Zhou .................... H04L 5/0048 |
| 2019/0215870 A1* | 7/2019 | Babaei .................. H04W 24/10 |
| 2019/0215888 A1* | 7/2019 | Cirik .................... H04B 7/0695 |
| 2019/0215897 A1* | 7/2019 | Babaei .................. H04W 76/38 |
| 2019/0306765 A1* | 10/2019 | Cirik .................... H04W 72/046 |
| 2019/0349060 A1* | 11/2019 | Liao ........................ H04L 5/005 |
| 2019/0380054 A1* | 12/2019 | Manolakos ........... H04L 5/0053 |

\* cited by examiner

METHOD AND DEVICE OF TRANSMITTING AND RECEIVING CHANNEL STATE INFORMATION REPORT

CROSS-REFERENCE TO RELATED APPLICATION

The present application is the U.S. national phase of PCT Application No. PCT/CN2019/073401 filed on Jan. 28, 2019, which claims a priority to the Chinese patent application No. 201810152163.X filed in China on Feb. 14, 2018, a disclosure of which is incorporated herein by reference in its entirety.

TECHNICAL FIELD

The present disclosure relates to the field of communication technology, in particular to a method of transmitting and receiving a channel state information (CSI) report and a device of transmitting and receiving a CSI report.

BACKGROUND

With the development of mobile communication technologies, $5^{th}$ generation (5G) mobile communication systems are on the horizon. To support greater system throughput and user equipment (UE) throughput, 5G systems support frequency domain division, so that UE may transmit and receive signals on different frequency domain transmission resources.

For example, 5G systems support a maximum system bandwidth of 400 MHz, which is far greater than the maximum system bandwidth of 20 MHz in LTE, thereby supporting greater system throughput and UE throughput. Meanwhile, 5G systems also support flexible dynamic bandwidth allocation, wherein system bandwidth may be divided into multiple bandwidth parts (Band Width Part, BWPs), to support narrow-band UE or UE in a power saving mode to operate only on a portion of the system bandwidth.

For another example, 5G systems may employ carrier aggregation (Carrier Aggregation, CA), wherein two or more component carriers (Component Carrier, CCs) may be aggregated together to support greater transmission bandwidth (up to 100 MHz). Each CC corresponds to an independent cell. A cell operating on the primary band is called primary cell (PCell), while a cell operating on the secondary band is called secondary cell (SCell). During wireless communication, various SCells may be activated (or enabled) as needed, to provide additional radio resources to meet communication requirements.

In a communication system provided with a plurality of frequency domain transmission resources, wireless communication may be performed by activating different frequency domain transmission resources based on requirements. Therefore, a method of transmitting and receiving a CSI report is needed, so that transmission and reception of a periodic/semi-persistent CSI report may be kept uninterrupted when the frequency domain transmission resource changes.

SUMMARY

An embodiment of the present disclosure is to provide a method and a device of transmitting and receiving a CSI report, so that reception and transmission of a CSI report may be kept uninterrupted when a variation in frequency domain transmission resource occurs.

In a first aspect, the present disclosure provides a method of transmitting a CSI report. The method is applied to a UE and includes: receiving a first indication on a second downlink (DL) frequency domain transmission resource, wherein the first indication is used to activate a first DL frequency domain transmission resource; transmitting a CSI report on a first uplink (UL) frequency domain transmission resource according to a first CSI report configuration corresponding to the first DL frequency domain transmission resource when it is determined that there is the first CSI report configuration and it is determined that a CSI-reference signal (RS) corresponding to the first CSI report configuration is received on the first DL frequency domain transmission resource, wherein the first CSI report configuration includes a periodicity characteristic of the CSI report.

In a second aspect, the present disclosure provides a method of receiving a CSI report. The method is applied to a network device and includes: transmitting a first indication on a second downlink (DL) frequency domain transmission resource, wherein the first indication is used to activate a first DL frequency domain transmission resource; receiving a CSI report on a first uplink (UL) frequency domain transmission resource according to a first CSI report configuration corresponding to the first DL frequency domain transmission resource when it is determined that there is the first CSI report configuration and it is determined that a CSI-reference signal (RS) corresponding to the first CSI report configuration is transmitted on the first DL frequency domain transmission resource, wherein the first CSI report configuration includes a periodicity characteristic of the CSI report.

In a third aspect, the present disclosure provides a UE, including: an operation indication reception module, configured to receive a first indication on a second downlink (DL) frequency domain transmission resource, wherein the first indication is used to activate a first DL frequency domain transmission resource; a report transmission module, configured to transmit a CSI report on a first uplink (UL) frequency domain transmission resource according to a first CSI report configuration corresponding to the first DL frequency domain transmission resource when it is determined that there is the first CSI report configuration and it is determined that a CSI-reference signal (RS) corresponding to the first CSI report configuration is received on the first DL frequency domain transmission resource, wherein the first CSI report configuration includes a periodicity characteristic of the CSI report.

In a fourth aspect, the present disclosure provides a network device, including: an operation indication transmission module, configured to transmit a first indication on a second downlink (DL) frequency domain transmission resource, wherein the first indication is used to activate a first DL frequency domain transmission resource; a report reception module, configured to receive a CSI report on a first uplink (UL) frequency domain transmission resource according to a first CSI report configuration corresponding to the first DL frequency domain transmission resource when it is determined that there is the first CSI report configuration and it is determined that a CSI-reference signal (RS) corresponding to the first CSI report configuration is transmitted on the first DL frequency domain transmission resource, wherein the first CSI report configuration includes a periodicity characteristic of the CSI report.

In a fifth aspect, the present disclosure provides a UE, including: a memory, a processor and a computer program stored in the memory and configured to be executed by the processor, wherein the processor is configured to execute the computer program, to implement steps of the method described in the first aspect.

In a sixth aspect, the present disclosure provides a computer readable storage medium storing therein a computer program, wherein the computer program is configured to be executed by a processor, to implement steps of the method described in the first aspect.

In a seventh aspect, the present disclosure provides a network device, including: a memory, a processor and a computer program stored in the storage and configured to be executed by the processor, wherein the processor is configured to execute the computer program, to implement steps of the method described in the second aspect.

In an eighth aspect, the present disclosure provides a computer readable storage medium storing therein a computer program, wherein the computer program is configured to be executed by a processor, to implement steps of the method described in the second aspect.

In embodiments of the present disclosure, when a new frequency domain transmission resource is activated, the signal transmission and reception may be performed according to configuration information corresponding to the new frequency domain transmission resource, thereby enabling uninterrupted wireless communication. For example, when UE is transmitting a CSI report, if a new UL frequency domain transmission resource is activated, such as in the case that the network device indicates a switch to a new BWP or a new secondary cell is enabled, the transmission and reception of the CSI report may be performed in an uninterrupted manner by using the method of transmitting and receiving a CSI report according to some embodiments of the present disclosure, thereby meeting communication requirements of the wireless communication system.

BRIEF DESCRIPTION OF THE DRAWINGS

The drawings described here serve to facilitate the understanding of the present disclosure, and constitute a part of the present disclosure. The exemplary embodiments and descriptions thereof in the present disclosure are used to explain the present disclosure, and place, by no means, an undue limitation on the present disclosure. In the drawing.

DETAILED DESCRIPTION

The technical solutions in the embodiments of the present disclosure are clearly and thoroughly described below with reference to the accompanying drawings of the embodiments of the present disclosure. Apparently, the described embodiments are some embodiments of the present disclosure, but are not all the embodiments. Based on the embodiments of the present disclosure, all other embodiments derived by a person of ordinary skill in the art shall fall within the scope of the present disclosure.

The technical solutions of the present disclosure may be applied to various communication systems similarly provided with multiple frequency domain transmission resources or space domain positions, such as a $5^{th}$ generation (5G) New Radio (NR) mobile communication system, LTE/eLTE connected to 5G core network (5GC) (evolved universal terrestrial radio access (E-UTRA) connected to 5GC).

A UE, also called a mobile terminal (MT), a mobile user equipment, etc., may communicate with one or more core networks via a radio access network (RAN). The UE may be a mobile terminal, e.g., a mobile phone (or cellular phone) or a computer provided with a mobile terminal, such as a portable, pocket-sized, handheld, computer built-in or in-vehicle mobile apparatus, which exchanges voice and/or data with the RAN.

The network device may be a base station. The base station may be a base transceiver station (BTS) in a global system for mobile communications (GSM) or code division multiple access (CDMA), or may be a Node B in wideband code division multiple access (WCDMA), or may be an evolved Node B (eNB or eNodeB) in LTE or a 5G gNodeB (gNB), which is not limited in the present disclosure. However, for ease of description, a gNB is used as an example in description of following embodiments.

To achieve more flexible signal reception and transmission, frequency domain may be divided in 5G systems. For example, the system bandwidth may be divided into multiple portions to form multiple bandwidth parts (BWPs); optionally, frequency bands, carriers or component carriers of a system may be divided to form multiple frequency domain transmission resources or to form multiple secondary cells (SCell).

In a communication system, the network device may configure frequency domain transmission resources of serving cell for UE. For example, at least one DL BWP for DL reception can be configured for UE through higher layer signaling, namely, radio resource control (RRC) message. If multiple DL BWPs are configured, a DL BWP set may be formed. It may be stipulated that the network device may configure at most four DL BWPs for UE. For another example, at least one uplink (UL) BWP for UL transmission can be configured for UE through higher layer signaling, namely, RRC message. If multiple UL BWPs are configured, an UL BWP set may be formed. It may be stipulated that the network device may configure at most four UL BWPs for UE.

For a communication system provided with multiple frequency domain transmission resources as a result of division (taking the frequency domain transmission resource being BWP for example), the network device may indicate, as needed, an activated DL BWP by transmitting downlink control information (DCI) over a physical downlink control channel (PDCCH). For example, the network device may activate a DL BWP by using a BWP indicator field in the DCI. Accordingly, the UE receives information over the PDCCH and a physical downlink shared channel (PDSCH) according to the subcarrier spacing and the length of cyclic prefix (CP) in the numerology corresponding to the DL BWP indicated by the DCI.

Additionally, the network device may indicate, as needed, an activated UL BWP by using the BWP indicator field in the DCI. Accordingly, the UE transmits information over a physical uplink control channel (PUCCH) and a physical uplink shared channel (PUSCH) according to the subcarrier spacing and the length of cyclic prefix (CP) configured for the UL BWP.

Hereinafter, the technical solutions provided by various embodiments of the present disclosure are described in detail with reference to the accompanying drawings.

Embodiment 1

Figure 1:
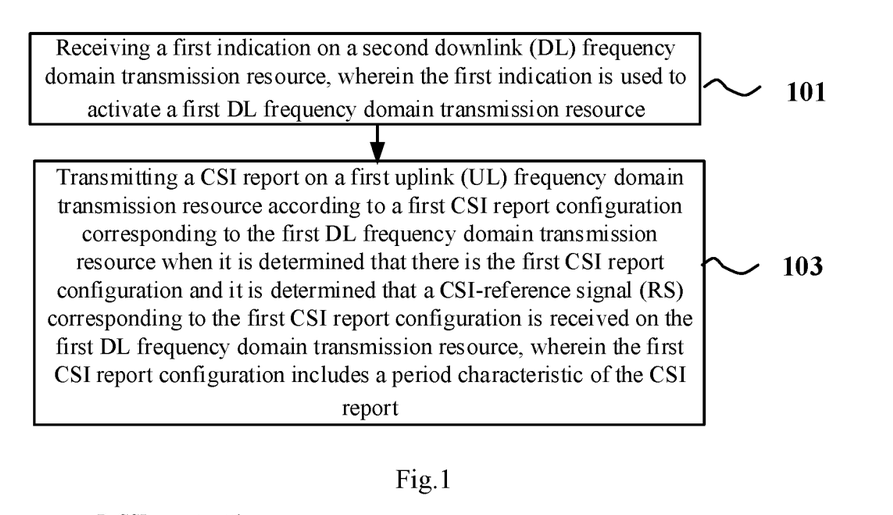
FIG. 1 is a schematic flow diagram of a method of transmitting a CSI report according to some embodiments of the present disclosure.

Referring to FIG. 1, an embodiment of the present disclosure provides a method of transmitting a CSI report, which is applied to a UE. The method is used to transmit a CSI report and may specifically include following steps.

Step 101: receiving a first indication on a second downlink (DL) frequency domain transmission resource, wherein the first indication is used to activate a first DL frequency domain transmission resource.

It is noted, the first indication received by the UE through performing the Step 101 may activate a first DL frequency domain transmission resource. For example, when the frequency domain transmission resource is a DL BWP, the UE may switch the DL BWP from a second DL BWP (which may be denoted as DL BWPi) to a first DL BWP (which may be denoted as DL BWPj) by receiving the first indication transmitted by a network device in the second DL BWP. It is understood, after the DL BWP is switched to the first DL BWP, the UE stops receiving information in the second DL BWP.

For another example, when the frequency domain transmission resource is a DL SCell, the UE may activate a first DL SCell (which may be denoted as DL SCellj) by receiving the first indication. It is understood, after the first DL SCellj is activated (or enabled), the UE may receive information transmitted by the network device in the first DL SCellj; meanwhile, the UE may continue receiving information transmitted by the network device in a second DL SCell (which may be denoted as DL SCelli) where the first indication is received or a DL PCell.

Optionally, when the DL frequency domain transmission resource is a DL BWP, the UE may receive DCI including the first indication, to activate the first DL frequency domain transmission resource (specifically, the first DL BWP).

Optionally, when the DL frequency domain transmission resource is a DL SCell, the UE may receive a medium access control-control element (MAC CE) including the first indication, to activate the first DL frequency domain transmission resource (specifically, the first DL SCell).

Step 103: transmitting a CSI report on a first uplink (UL) frequency domain transmission resource according to a first CSI report configuration corresponding to the first DL frequency domain transmission resource when it is determined that there is the first CSI report configuration and it is determined that a CSI-reference signal (RS) corresponding to the first CSI report configuration is received on the first DL frequency domain transmission resource, wherein the first CSI report configuration includes a periodicity characteristic of the CSI report.

It is noted, the CSI report configuration corresponding to the DL frequency domain transmission resource may be set by the UE through receiving configuration information carrying the CSI report configuration. The configuration information may be received by means of an RRC message. In a specific implementation, the configuration information may include a CSI report configuration corresponding to at least one DL frequency domain transmission resource. Optionally, the configuration information may further include a CSI report configuration corresponding to all DL frequency domain transmission resources. The network device may set a CSI report configuration independently for each DL frequency domain transmission resource (that is, each CSI report configuration corresponds only to one DL frequency domain transmission resource), or the network device may set one CSI report configuration for multiple corresponding DL frequency domain transmission resources, e.g., all DL frequency domain transmission resources. The UE receives the CSI report configuration accordingly.

Optionally, the configuration information of the CSI report configuration may include a periodicity characteristic of CSI reporting, which may specifically include periodic (P), semi-persistent (SP) and aperiodic (AP). For a periodic CSI report (which may be denoted as P CSI report) or a semi-persistent CSI report (which may be denoted as SP CSI report), the configuration information of the CSI report configuration may include period configuration parameter of CSI reporting, which is used to configure period parameter of the CSI report. For the P CSI report or SP CSI report transmitted over the PUCCH or PUSCH, the period configuration parameter of CSI reporting may specifically include CSI report periodicity, slot offset and the like. For an aperiodic CSI report (which may be denoted as AP CSI report), the configuration information of the CSI report configuration may include multiple candidate time offsets.

Optionally, a time reference for the transmission periodicity (in units of slot) and the slot offset (in units of slot) of the P CSI report or SP CSI report may be selected as follows.

Option 1: the UL BWP in which the P CSI report or SP CSI report is transmitted is selected as the time reference. In this way, even if a DL BWP switch occurs and the numerology changes, the periodicity and the slot offset in units of second of the CSI report won't change as long as the numerology of UL BWP remains unchanged. If an UL BWP switch occurs and the numerology changes, even if the configured periodicity and slot offset in units of slot remain unchanged, the periodicity and the slot offset in units of second of the CSI report would change.

Option 2: the DL BWP corresponding to the CSI report configuration is selected as the time reference. In the case that a DL BWP switch occurs and the numerology changes, if the numerology of UL BWP remains unchanged, the periodicity and slot offset in units of slot of P-CSI report or SP-CSI report transmitted in the UL BWP would change in connection with the change of DL BWP numerology.

Specifically, if a ratio between the slot duration before the DL BWP switch and the slot duration after the DL BWP switch is $T_{DL,1}/T_{DL,2}$, the periodicity of the CSI report becomes $T_{DL,1}/T_{DL,2}*P_{DL}$ (in units of slot), wherein the $P_{DL}$ is the period corresponding to the DL BWP before the switch (in units of slot). When $T_{DL,1}/T_{DL,2}*P_{DL}$ is a positive integer, the periodicity value is valid. If the numerology of DL BWP remains unchanged, an UL BWP switch occurs and the numerology changes, the periodicity and slot offset in units of slot of P-CSI report or SP-CSI report transmitted in the newly activated UL BWP would change in connection with the change of UL BWP numerology. Specifically, if a ratio between the slot duration before the UL BWP switch and the slot duration after the UL BWP switch is $T_{UL,1}/T_{UL,2}$, the periodicity of the CSI report becomes $T_{UL,1}/T_{UL,2}*P_{DL}$ (in units of slot), wherein the $P_{DL}$ is the periodicity corresponding to the DL BWP (in units of slot). When $T_{UL,1}/T_{UL,2}*P_{DL}$ is a positive integer, the periodicity value is valid.

In some embodiments of the present disclosure, before the UE transmits a CSI report to the network device, the network device may configure a CSI resource configuration and a CSI report configuration corresponding to the DL frequency domain transmission resource for UE through RRC. The network device may further configure a CSI measurement configuration through measurement configuration parameter (MeasLinkConfig) in the RRC. The CSI measurement configuration may include multiple measurement links, wherein each measurement link associates a CSI report configuration to one or more CSI resource configurations, and a corresponding measurement quantity is configured in a measurement quantity parameter (MeasQuantity). All CSI resource configurations associated to the same CSI report configuration are related to the same DL frequency domain transmission resource (e.g., DL BWP). The CSI report of UE corresponds to an activated DL frequency domain transmission resource; moreover, in a slot n, a CSI report corresponding to a DL frequency domain transmission resource is transmitted to the network device only when the CSI reference signal (RS) corresponding to the CSI report corresponds to an activated DL frequency domain transmission resource. The CSI report is only transmitted on an activated UL frequency domain transmission resource, and the UL frequency domain transmission resource on which the CSI report is transmitted may or may not be the same as any DL frequency domain transmission resource.

Corresponding to CSI-RSs with different periodicity characteristics, CSI reports with different periodicity characteristics may be activated in different manners.

Figure 2:
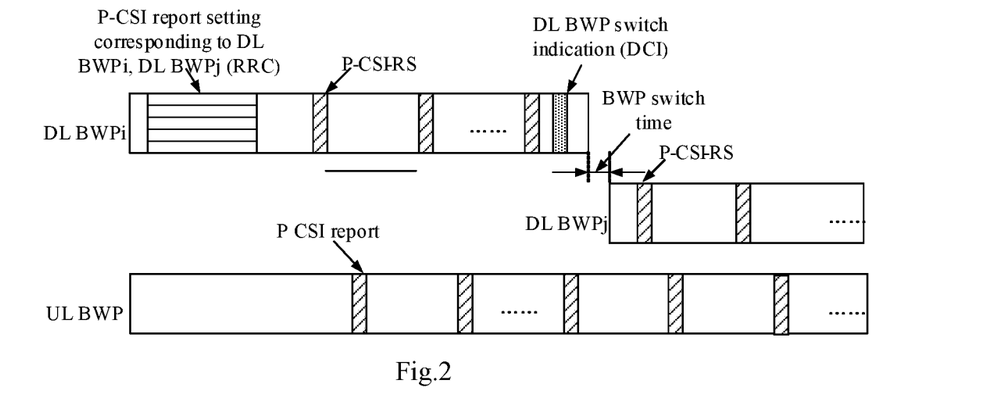
FIG. 2 is a schematic timing diagram of interaction between a network device and a UE according to some embodiments of the present disclosure.

Optionally, a periodic CSI report (which may be denoted as P CSI report) may only support the report of measurement quantity of periodic CSI-RS (which may be denoted as P-CSI-RS), that is, the CSI-RS corresponding to a P-CSI report configuration is P-CSI-RS, and the CSI-RS associated to one P-CSI report configuration is the P-CSI-RS configured by at least one P-CSI resource configuration. The UE may transmit the CSI report over a PUCCH. The CSI report configuration may be received by means of an RRC message, and may include the periodicity and slot offset of the CSI report. As long as the UE determines that a first CSI report corresponding to the first DL frequency domain transmission resource has been configured, in another word, as long as the UE determines that there is a first CSI report configuration corresponding to the first DL frequency domain transmission resource, and it is determined that the CSI-RS corresponding to the first CSI report configuration is received on the first DL frequency domain transmission resource, the transmission of CSI report may be activated. Therefore, the UE can directly transmit the CSI report on the first UL frequency domain transmission resource according to the first CSI report configuration, referring to the timing diagram of FIG. 2. Correspondingly, the network device may receive the CSI report on the first UL frequency domain transmission resource according to the first CSI report configuration. It is understood, the first UL frequency domain transmission resource on which the CSI report is transmitted by the UE may or may not be the same as any DL frequency domain transmission resource. It is also understood, the P CSI report is not applicable to semi-persistent CSI-RS and aperiodic CSI-RS, and does not support the transmission of measurement quantities of semi-persistent CSI-RS and aperiodic CSI-RS.

Optionally, the semi-persistent CSI report (which may be denoted as SP CSI report) may support the transmission of measurement quantities of periodic CSI-RS (which may be denoted as P-CSI-RS) or semi-persistent CSI-RS (which may be denoted as SP-CSI-RS), that is, the CSI-RS corresponding to the SP CSI report configuration is P-CSI-RS or SP-CSI-RS, and the CSI-RS associated to one SP CSI report configuration is at least one P-CSI-RS configured by a periodic CSI resource configuration or SP-CSI-RS configured by a semi-persistent CSI resource configuration. If the SP CSI report is transmitted over PUCCH, the CSI report may be configured by RRC, the CSI report configuration may include the periodicity and slot offset of CSI report; moreover, the transmission of SP CSI report may be activated by means of MAC CE. If the SP CSI report is transmitted over PUSCH, the CSI report may be configured by RRC, the CSI report configuration may include the periodicity and slot offset of CSI report; moreover, the transmission of SP CSI report may be activated by means of DCI.

For an SP CSI report, when the UE determines that a first CSI report corresponding to the first DL frequency domain transmission resource has been configured, in another word, when the UE determines that there is a first CSI report configuration corresponding to the first DL frequency domain transmission resource, and it is determined that the CSI-RS corresponding to the first CSI report configuration is received on the first DL frequency domain transmission resource, the SP CSI report transmission may be activated in various manners.

Optionally, the UE may receive a first activation indication on a first DL frequency domain transmission resource after receiving the first indication for activating the first DL frequency domain transmission resource. Taking a case in which the DL frequency domain transmission resource is DL BWP for example, the UE has configured the SP CSI report configuration for a second DL BWP (which may be denoted as DL BWPi) and a first DL BWP (which may be denoted as DL BWPj) by means of RRC, and has activated the SP CSI report in the DL BWPi. After the first indication is received, and the DL frequency domain bandwidth is switched from the DL BWPi to the DL BWPj, the UE may stop transmitting SP CSI report. Correspondingly, the network device may stop receiving the SP CSI report. Only when it is determined that the next DL frequency domain transmission resource (here, DL BWPj) is in an active state and a first activation indication is received, the UE transmits the SP CSI report on the first UL frequency domain transmission resource according to the first CSI report configuration (corresponding to the SP CSI report for the DL BWPj). Correspondingly, the network device receives the SP CSI report corresponding to the SP CSI report configuration for DL BWPj on the first UL frequency domain transmission resource.

Optionally, the UE may receive a first activation indication on a second DL frequency domain transmission resource before receiving the first indication for activating the first DL frequency domain transmission resource. For example, the UE may receive a MAC CE including the first activation indication. After the DL frequency domain bandwidth is switched to a first DL frequency domain transmission resource (e.g., DL BWPj), the UE may directly transmit the SP CSI report on the first UL frequency domain transmission resource according to the CSI report configuration corresponding to the first DL frequency domain transmission resource over a PUCCH. Correspondingly, the network device receives the SP CSI report on the first UL frequency domain transmission resource according to the CSI report configuration corresponding to the first DL frequency domain transmission resource.

Optionally, the UE may receive a first activation indication on a second DL frequency domain transmission resource before receiving the first indication for activating the first DL frequency domain transmission resource. For example, in the case that the frequency domain transmission resource is BWP, the first activation indication may be an MAC CE (SP CSI report based on PUCCH) or DCI (SP CSI report based on PUSCH) transmitted before the DL BWP switch and used for activating the SP CSI report for DL BWPj. Specifically, the UE may receive DCI including the first activation indication. After the DL frequency domain bandwidth is switched to a first DL frequency domain transmission resource (e.g., DL BWPj), the UE may directly transmit the SP CSI report on the first UL frequency domain transmission resource according to the CSI report configuration corresponding to the first DL frequency domain transmission resource over a PUSCH. Correspondingly, the network device receives the SP CSI report on the first UL frequency domain transmission resource according to the CSI report configuration corresponding to the first DL frequency domain transmission resource.

It is understood, the first activation indication (when transmitted over the PUCCH, it can be received by means of MAC CE; when transmitted over the PUSCH, it can be received by means of DCI) is used for activating the transmission of CSI report according to the first CSI report configuration corresponding to the first DL frequency domain transmission resource, or used for activating the transmission of CSI report according to the CSI report configuration corresponding to at least one DL frequency domain transmission resource. It is understood, the at least one DL frequency domain transmission resource includes the first DL frequency domain transmission resource. Specifically, when CSI report information includes a CSI report configuration corresponding to at least one DL frequency domain transmission resource, the first activation indication may be used to activate SP CSI reporting according to an SP CSI report configuration corresponding to any DL frequency domain transmission resource that is included in the CSI report information.

Optionally, the network device may transmit the first activation indication by carrying the first activation indication in the first indication. Correspondingly, the UE receives the first activation indication by receiving the first indication. The first indication is DCI, a field may be added in the DCI to indicate what SP CSI reporting according to a CSI report configuration on a certain DL frequency domain transmission resource should be activated; or an existing field in the DCI may be repurposed to indicate what SP CSI reporting according to a CSI report configuration on a certain DL frequency domain transmission resource should be activated.

Figure 3:
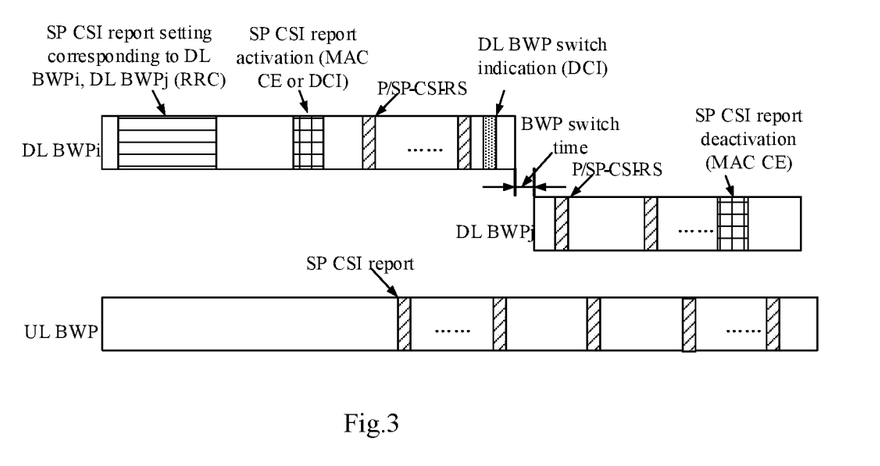
FIG. 3 is a second schematic timing diagram of interaction between a network device and a UE according to some embodiments of the present disclosure.

Optionally, referring to the timing diagram of FIG. 3, before receiving a deactivation indication, the UE may transmit an SP CSI report according to the first CSI report configuration corresponding to the first DL frequency domain transmission resource without reactivation (the transmission of SP CSI report has been activated on the second DL frequency domain transmission resource). The UE may stop transmitting the CSI report on the first UL frequency domain transmission resource when a deactivation indication is received by the UE. The deactivation indication transmitted by the network device to the UE may be used to prevent the UE from transmitting a CSI report according to a CSI report configuration corresponding to at least one DL frequency domain transmission resource. It is understood, the at least one DL frequency domain transmission resource includes the first DL frequency domain transmission resource.

The above description illustrates, by way of example, how to transmit CSI report with a periodicity characteristic of periodic or semi-persistent when it is determined that a first CSI report configuration corresponding to the first DL frequency domain transmission resource is available and it is determined that a CSI-RS corresponding to the first CSI report configuration is received on the first DL frequency domain transmission resource.

Optionally, regardless of whether the CSI report has a periodicity characteristic of periodic or semi-persistent, when it is determined that there is no first CSI report configuration corresponding to the first DL frequency domain transmission resource or a CSI-RS associated to the CSI report configuration of the first DL frequency domain transmission resource is not received on the first DL frequency domain transmission resource, the UE does not transmit a CSI report corresponding to the first DL frequency domain transmission resource after the first DL frequency domain transmission resource is in an active state. Correspondingly, the network device does not receive the CSI report corresponding to the first DL frequency domain transmission resource.

Optionally, when it is determined that multiple CSI report configurations are available and it is determined that a CSI-RS associated to a latest CSI report configuration is received on the first DL frequency domain transmission resource, the latest CSI report configuration may be determined as the first CSI report configuration; further, the UE transmits a CSI report on the first UL frequency domain transmission resource based on the first CSI report configuration. Correspondingly, the network device receives the CSI report on the first UL frequency domain transmission resource based on the latest CSI report configuration (the first CSI report configuration). It is understood, "the latest configuration" refers to a first CSI resource configuration whose configuration time is closest to the time when the first DL frequency domain transmission resource is activated.

In the embodiment of the present disclosure, when a new frequency domain transmission resource is activated, the signal transmission and reception may be performed according to configuration information corresponding to the new frequency domain transmission resource, thereby enabling uninterrupted wireless communication. When UE is transmitting a CSI report, if a new DL frequency domain transmission resource is activated by the network device, such as the BWP is switched to a new BWP or a new secondary cell is enabled, the transmission of CSI report may be performed in an uninterrupted manner by using the method for transmitting and receiving a CSI report according to some embodiments of the present disclosure, thereby meeting communication requirements of the wireless communication system.

Embodiment 2

Figure 4:
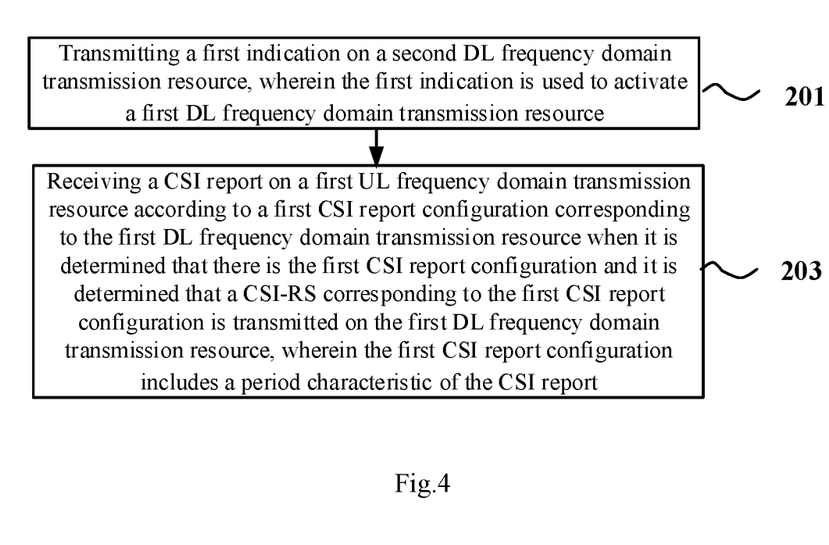
FIG. 4 is another schematic flow diagram of a method of receiving a CSI report according to some embodiments of the present disclosure.

Referring to FIG. 4, an embodiment of the present disclosure further provides a method of receiving a CSI report, which is applied to a network device. It is understood, the interaction between the UE and the network device described from the perspective of the network device side is the same as those described from the perspective of the UE side, thus a related description is omitted to avoid redundancy.

The method as shown in FIG. 4 is used to receive a CSI report, and may specifically include following steps.

Step 201: transmitting a first indication on a second DL frequency domain transmission resource, wherein the first indication is used to activate a first DL frequency domain transmission resource.

Step 203: receiving a CSI report on a first UL frequency domain transmission resource according to a first CSI report configuration corresponding to the first DL frequency domain transmission resource when it is determined that there is the first CSI report configuration and it is determined that a CSI-RS corresponding to the first CSI report configuration is transmitted on the first DL frequency domain transmission resource, wherein the first CSI report configuration includes a periodicity characteristic of the CSI report.

Optionally, in an embodiment, the method as shown in FIG. 4 further includes: transmitting first configuration information including a CSI report configuration corresponding to at least one DL frequency domain transmission resource, wherein the at least one DL frequency domain transmission resource includes the first DL frequency domain transmission resource; or transmitting second configuration information including a CSI report configuration corresponding to all DL frequency domain transmission resources, wherein the all DL frequency domain transmission resources include the first DL frequency domain transmission resource.

Optionally, in an embodiment, the method as shown in FIG. 4 further includes: determining a latest CSI report configuration as the first CSI report configuration when it is determined that there are a plurality of CSI report configurations corresponding to the first DL frequency domain transmission resource and it is determined that a CSI-RS associated to the latest CSI report configuration is also transmitted on the first DL frequency domain transmission resource.

Optionally, in an embodiment, the periodicity characteristic of the CSI report is periodic.

Optionally, in an embodiment, the periodicity characteristic of the CSI report is semi-persistent, the receiving the CSI report on the first UL frequency domain transmission resource according to the first CSI report configuration in the Step 203 includes: receiving the CSI report on the first UL frequency domain transmission resource according to the first CSI report configuration when it is determined that the first DL frequency domain transmission resource is in an active state and a first activation indication is transmitted, wherein the first activation indication is used to activate reception of the CSI report according to a first CSI report configuration corresponding to the first DL frequency domain transmission resource, or is used to activate reception of the CSI report according to a CSI report configuration corresponding to at least one DL frequency domain transmission resource.

Optionally, in an embodiment, the method as shown in FIG. 4 further includes: transmitting the first activation indication on the second DL frequency domain transmission resource before transmission of the first indication; or transmitting the first activation indication on the first DL frequency domain transmission resource after transmission of the first indication.

Optionally, in an embodiment, the method as shown in FIG. 4 further includes: transmitting an MAC CE, wherein the MAC CE includes the first activation indication; the receiving the CSI report on the first UL frequency domain transmission resource according to the first CSI report configuration in the Step 203 includes: receiving the CSI report on the first UL frequency domain transmission resource according to the first CSI report configuration over a physical uplink control channel (PUCCH).

Optionally, in an embodiment, the method as shown in FIG. 4 further includes: transmitting downlink control information (DCI), wherein the DCI includes the first activation indication; the receiving the CSI report on the first UL frequency domain transmission resource according to the first CSI report configuration in the Step 203 includes: receiving the CSI report on the first UL frequency domain transmission resource according to the first CSI report configuration over a physical uplink shared channel (PUSCH).

Optionally, in an embodiment, the first indication carries the first activation indication.

Optionally, in an embodiment, the periodicity characteristic of the CSI report is semi-persistent, the method as shown in FIG. 4 further includes: when transmitting a deactivation indication, indicating to the UE that reception of the CSI report on the first UL frequency domain transmission resource is stopped, wherein the deactivation indication is used to indicate to UE that reception of the CSI report according to a CSI report configuration corresponding to at least one DL frequency domain transmission resource is stopped, and the at least one DL frequency domain transmission resource includes the first DL frequency domain transmission resource.

Optionally, in an embodiment, the DL frequency domain transmission resources include at least one of DL bandwidth part (BWP) and DL secondary cell; the UL frequency domain transmission resource includes at least one of UL BWP and UL secondary cell.

Embodiment 3

Figure 5:
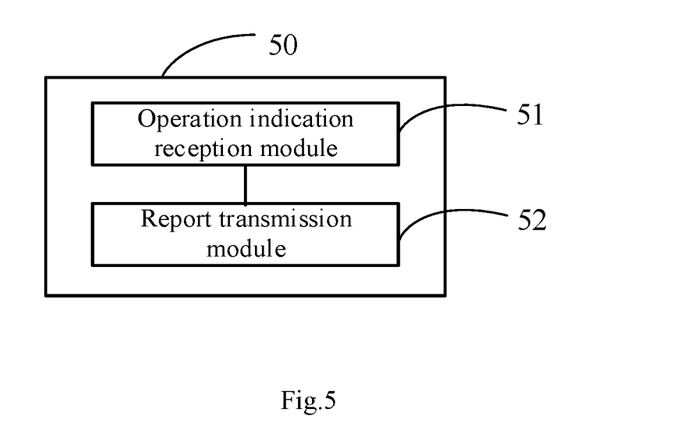
FIG. 5 is a schematic structural diagram of a UE according to some embodiments of the present disclosure.

Referring to FIG. 5, an embodiment of the present disclosure provides a UE. The UE 50 includes: an operation indication reception module 51, configured to receive a first indication on a second downlink (DL) frequency domain transmission resource, wherein the first indication is used to activate a first DL frequency domain transmission resource; a report transmission module 52, configured to transmit a CSI report on a first uplink (UL) frequency domain transmission resource according to a first CSI report configuration corresponding to the first DL frequency domain transmission resource when it is determined that there is the first CSI report configuration and it is determined that a CSI-RS corresponding to the first CSI report configuration is received on the first DL frequency domain transmission resource, wherein the first CSI report configuration includes a periodicity characteristic of the CSI report.

Optionally, in an embodiment, the UE further includes: a first configuration information reception module, configured to receive first configuration information including a CSI report configuration corresponding to at least one DL frequency domain transmission resource, wherein the at least one DL frequency domain transmission resource includes the first DL frequency domain transmission resource; or a second configuration information reception module, configured to receive second configuration information including a CSI report configuration corresponding to all DL frequency domain transmission resources, wherein the all DL frequency domain transmission resources include the first DL frequency domain transmission resource.

Optionally, in an embodiment, the UE further includes: a report configuration determination module, configured to determine a latest CSI report configuration as the first CSI report configuration when it is determined that there are a plurality of CSI report configurations corresponding to the first DL frequency domain transmission resource and it is determined that a CSI-RS associated to the latest CSI report configuration is also received on the first DL frequency domain transmission resource.

Optionally, in an embodiment, the periodicity characteristic of the CSI report is semi-persistent, the report transmission module 52 includes: a report transmission unit, configured to transmit the CSI report on the first UL frequency domain transmission resource according to the first CSI report configuration when it is determined that the first DL frequency domain transmission resource is in an active state and a first activation indication is received, wherein the first activation indication is used to activate transmission of the CSI report according to a first CSI report configuration corresponding to the first DL frequency domain transmission resource, or is used to activate transmission of the CSI report according to a CSI report configuration corresponding to at least one DL frequency domain transmission resource.

Optionally, in an embodiment, the UE further includes: a first activation-indication-reception module, configured to receive the first activation indication on the second DL frequency domain transmission resource before reception of the first indication; or a second activation-indication-reception module, configured to receive the first activation indication on the first DL frequency domain transmission resource after reception of the first indication.

Optionally, in an embodiment, the UE further includes: a medium access control-control element (MAC CE) reception module, configured to receive an MAC CE, wherein the MAC CE includes the first activation indication; the report transmission module 52 includes: a first report transmission unit, configured to transmit the CSI report on the first UL frequency domain transmission resource according to the first CSI report configuration over a physical uplink control channel (PUCCH).

Optionally, in an embodiment, the UE further includes: a downlink control information (DCI) reception module, configured to receive DCI, wherein the DCI includes the first activation indication; the report transmission module 52 includes: a second report transmission unit, configured to transmit the CSI report on the first UL frequency domain transmission resource according to the first CSI report configuration over a physical uplink shared channel (PUSCH).

Optionally, in an embodiment, the periodicity characteristic of the CSI report is semi-persistent, and the UE further includes: a deactivation indication reception module, configured to stop transmitting the CSI report according to a CSI report configuration corresponding to at least one DL frequency domain transmission resource when a deactivation indication is received, wherein the at least one DL frequency domain transmission resource includes the first DL frequency domain transmission resource.

For a description of the UE according to the embodiment of the present disclosure, a reference may be made to the process of the method as shown in FIG. 1 corresponding to an embodiment of the present disclosure, and the various units/modules in the UE and other aforementioned operations and/or functions are configured to implement corresponding steps in the method as shown in FIG. 1, thus, repeated descriptions thereof are omitted herein for conciseness.

Embodiment 4

Figure 6:
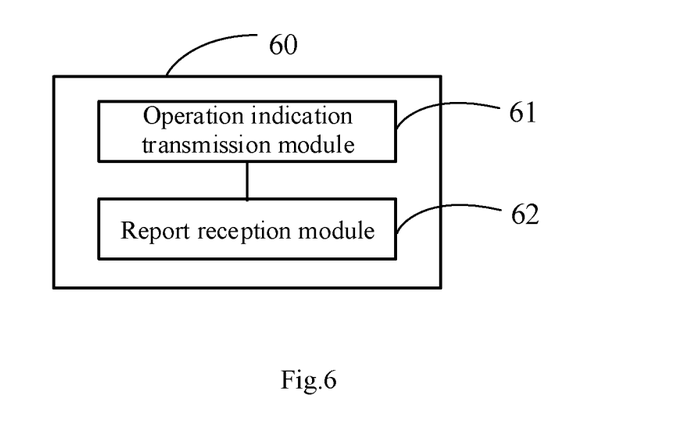
FIG. 6 is a schematic structural diagram of a network device according to some embodiments of the present disclosure.

Referring to FIG. 6, an embodiment of the present disclosure provides a network device. The network device 60 includes: an operation indication transmission module 61, configured to transmit a first indication on a second DL frequency domain transmission resource, wherein the first indication is used to activate a first DL frequency domain transmission resource; a report reception module 62, configured to receive a CSI report on a first uplink (UL) frequency domain transmission resource according to a first CSI report configuration corresponding to the first DL frequency domain transmission resource when it is determined that there is the first CSI report configuration and it is determined that a CSI-reference signal (RS) corresponding to the first CSI report configuration is transmitted on the first DL frequency domain transmission resource, wherein the first CSI report configuration includes a periodicity characteristic of the CSI report.

Optionally, in an embodiment, the network device further includes: a first configuration information transmission module, configured to transmit first configuration information including a CSI report configuration corresponding to at least one DL frequency domain transmission resource, wherein the at least one DL frequency domain transmission resource includes the first DL frequency domain transmission resource; or a second configuration information transmission module, configured to transmit second configuration information including a CSI report configuration corresponding to all DL frequency domain transmission resources, wherein the all DL frequency domain transmission resources include the first DL frequency domain transmission resource.

Optionally, in an embodiment, the network device further includes: a report configuration determination module, configured to determine a latest CSI report configuration as the first CSI report configuration when it is determined that there are a plurality of CSI report configurations corresponding to the first DL frequency domain transmission resource and it is determined that a CSI-RS associated to the latest CSI report configuration is also transmitted on the first DL frequency domain transmission resource.

Optionally, in an embodiment, the periodicity characteristic of the CSI report is semi-persistent, the report reception module 62 includes: a report reception unit, configured to receive the CSI report on the first UL frequency domain transmission resource according to the first CSI report configuration when it is determined that the first DL frequency domain transmission resource is in an active state and a first activation indication is transmitted, wherein the first activation indication is used to activate reception of the CSI report according to a first CSI report configuration corresponding to the first DL frequency domain transmission resource, or is used to activate reception of the CSI report according to a CSI report configuration corresponding to at least one DL frequency domain transmission resource.

Optionally, in an embodiment, the network device further includes: a first activation-indication-transmission module, configured to transmit the first activation indication on the second DL frequency domain transmission resource before transmission of the first indication; or a second activation-indication-transmission module, configured to transmit the first activation indication on the first DL frequency domain transmission resource after transmission of the first indication.

Optionally, in an embodiment, the network device further includes: a medium access control-control element (MAC CE) transmission module, configured to transmit an MAC CE, wherein the MAC CE includes the first activation indication; the report reception module 62 includes: a first report reception unit, configured to receive the CSI report on the first UL frequency domain transmission resource according to the first CSI report configuration over a physical uplink control channel (PUCCH).

Optionally, in an embodiment, the network device further includes: a downlink control information (DCI) transmission module, configured to transmit DCI, wherein the DCI includes the first activation indication; the report reception module 62 includes: a second report reception unit, configured to receive the CSI report on the first UL frequency domain transmission resource according to the first CSI report configuration over a physical uplink shared channel (PUSCH).

Optionally, in an embodiment, the periodicity characteristic of the CSI report is semi-persistent, and the network device further includes: a deactivation indication transmission module, configured to, when transmitting a deactivation indication, indicate to UE that reception of the CSI report on the first UL frequency domain transmission resource is stopped, wherein the deactivation indication is used to indicate to UE that reception of the CSI report according to a CSI report configuration corresponding to at least one DL frequency domain transmission resource is stopped, and the at least one DL frequency domain transmission resource includes the first DL frequency domain transmission resource.

For a description of the network device according to the embodiment of the present disclosure, a reference may be made to the process of the method as shown in FIG. 4 corresponding to an embodiment of the present disclosure, and the various units/modules in the network device and other aforementioned operations and/or functions are configured to implement corresponding steps in the method as shown in FIG. 4, thus, repeated descriptions thereof are omitted herein for conciseness.

Embodiment 5

Figure 7:
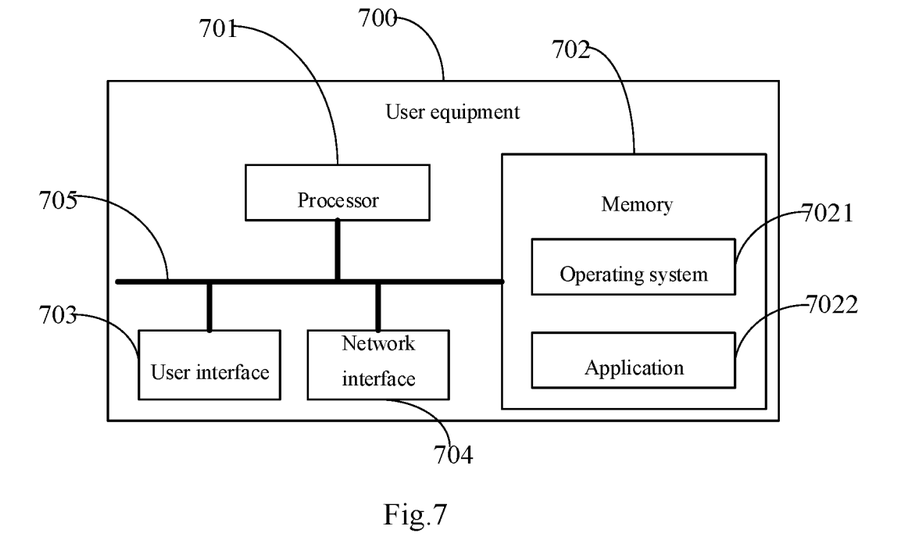
FIG. 7 is another schematic structural diagram of a UE according to some embodiments of the present disclosure.

FIG. 7 is a block diagram of a UE according to another embodiment of the present disclosure. The UE 700 as shown in FIG. 7 includes: at least one processor 701, a memory 702, at least one network interface 704, and a user interface 703. The various components in the UE 700 are coupled together by a bus system 705. It may be understood that the bus system 705 is configured to implement connection and communication among these components. The bus system 705 further includes a power bus, a control bus, and a status signal bus in addition to a data bus. However, for clarity of description, various buses in FIG. 7 are all labeled as the bus system 705.

The user interface 703 may include a display, a keyboard or a point-and-click device (for example, a mouse), a trackball, a touch pad, a touch screen, or the like.

It may be understood that the memory 702 in some embodiments of the present disclosure may be a volatile memory or a nonvolatile memory, or may include both a volatile memory and a nonvolatile memory. The nonvolatile memory may be a read-only memory (ROM), a programmable ROM (PROM), an erasable programmable PROM (EPROM), an electrically EPROM (EEPROM) or a flash memory. The volatile storage may be a random access memory (RAM), which is used as an external cache. By way of example rather than limitation, many forms of RAMs such as a static RAM (SRAM), a dynamic RAM (DRAM), a synchronous DRAM (SDRAM), a double-data-rate (DDR) SDRAM, an enhanced SDRAM (ESDRAM), a synch link DRAM (SLDRAM), and a direct Rambus RAM (DRRAM) may be used. The memory 702 in the system and method described in some embodiments of the present disclosure is intended to include, but is not limited to, these and any other appropriate types of memory.

In some implementations, the memory 702 stores executable modules or data structures, or a subset thereof, or an extended set thereof, for example, an operating system (OS) 7021 and an application 7022.

The operating system 7021 includes various system programs, such as a framework layer program, a core library layer program, and a driver layer program, to implement various basic services and process a hardware-based task. The application 7022 includes various applications such as a media player or a browser, to implement various application services. A program for implementing the method provided in some embodiments of the present disclosure may be included in the application 7022.

In some embodiments of the present disclosure, the UE 700 further includes a computer program stored in the memory 709 and configured to be executed by the processor 701. The processor 701 is configured to execute the computer program to implement the steps of the method as shown in FIG. 1, and the same technical effects may be achieved. To avoid repetition, a detailed description thereof is omitted herein.

The foregoing method disclosed in some embodiments of the present disclosure may be applied to the processor 701 or implemented by the processor 701. The processor 701 may be an integrated circuit chip having a signal processing capability. During implementation, the steps in the foregoing method may be accomplished by hardware integrated logic circuits or instructions in a software form in the processor 701. The processor 701 may be a general-purpose processor, a digital signal processor (DSP), an application-specific integrated circuit (ASIC), a field-programmable gate array (FPGA) or other programmable logic device, discrete gate or transistor logic device, a discrete hardware component, that can implement or execute the methods, steps, and logic block diagrams disclosed in some embodiments of the present disclosure. The general-purpose processor may be a microprocessor or the processor may be any conventional processor or the like. The steps in the method disclosed with reference to some embodiments of the present disclosure may be directly performed and accomplished by a hardware decoding processor, or performed and accomplished by a combination of hardware and software modules in a decoding processor. The software modules may reside in a computer-readable storage medium well-established in the art, such as a RAM, a flash memory, a ROM, a PROM or an electrically erasable programmable memory or a register. A computer-readable storage medium is located in the memory 702. The processor 701 reads information from the storage 702 and accomplishes the steps in the foregoing method using hardware of the processor 701. Specifically, a computer program is stored in the computer-readable storage medium. The computer program is configured to be executed by the processor 701 to implement the steps in the foregoing embodiment of the method as shown in FIG. 1.

It may be understood that these embodiments described in this disclosure may be implemented by hardware, software, firmware, middleware, microcode or a combination thereof. For hardware implementation, a processing unit may be implemented in one or more ASICs, a DSP, a DSP device (DSPD), a programmable logic device (PLD), a field-programmable gate array (FPGA), a general-purpose processor, a controller, a microcontroller, a microprocessor, other electronic unit configured to perform the functions in the present disclosure or a combination thereof.

For a software implementation, the techniques in some embodiments of the present disclosure may be implemented by modules (for example, processes or functions) performing the functions described in some embodiments of the present disclosure. Software codes may be stored in a memory and executed by a processor. The memory may be implemented internal or external to a processor.

Embodiment 6

Figure 8:
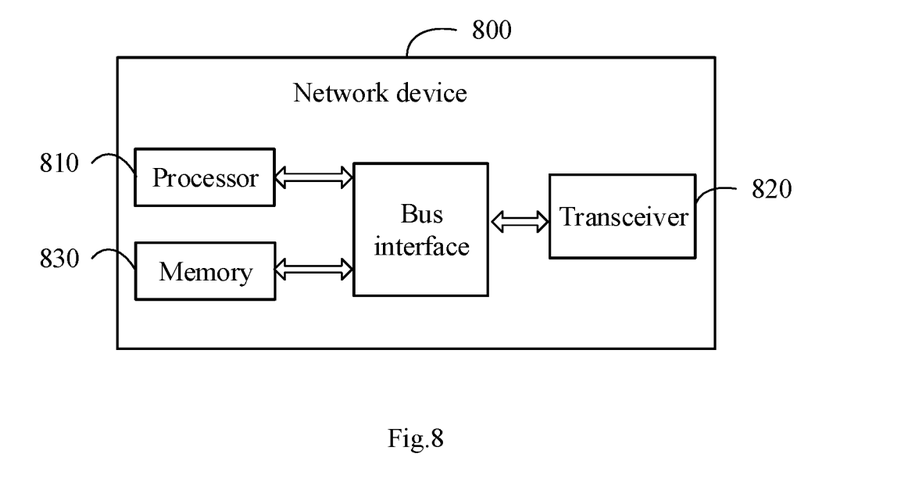
FIG. 8 is another schematic structural diagram of a network device according to some embodiments of the present disclosure.

FIG. 8 is a schematic structural diagram of a network device according to another embodiment of the present disclosure. As shown in FIG. 8, the network device 800 includes a processor 810, a transceiver 820, a memory 830, and a bus interface.

In some embodiments of the present disclosure, the network device 800 further includes a computer program stored in the memory 830 and configured to be executed by the processor 810. The processor 810 is configured to execute the computer program to implement the steps of the method as shown in FIG. 4, and the same technical effects may be achieved. To avoid repetition, a detailed description thereof is omitted herein.

In FIG. 8, a bus architecture may include any quantity of interconnected buses and bridges. Various circuits such as one or more processors represented specifically by the processor 810 and a memory represented by the memory 830 are linked together. The bus architecture may also link various other circuits such as peripherals, voltage regulators, and power management circuits, which are well known in the art, and therefore are not further described herein. The bus interface provides an interface. The transceiver 820 may include a plurality of elements, that is, a transmitter and a receiver, to provide units for communicating with various other apparatuses over a transmission medium.

The processor 810 is responsible for managing the bus architecture and general processing. The memory 830 can store data used by the processor 810 while performing operations.

Optionally, the present disclosure provides, in some embodiments, UE, including: a processor 701, a memory 702 and a computer program stored in the memory 702 and configured to be executed by the processor 701, wherein the processor 701 is configured to execute the computer program, to implement the steps of the method embodiment as shown in FIG. 1, and the same technical effects may be achieved. To avoid repetition, a detailed description thereof is omitted herein.

Optionally, the present disclosure provides, in some embodiments, a network device, including: a processor 810, a memory 830 and a computer program stored in the memory 830 and configured to be executed by the processor 810, wherein the processor 810 is configured to execute the computer program, to implement the steps of the method embodiment as shown in FIG. 4, and the same technical effects may be achieved. To avoid repetition, a detailed description thereof is omitted herein.

The present disclosure further provides, in some embodiments, a computer readable storage medium storing therein a computer program, wherein the computer program is configured to be executed by a processor, to implement the steps of the method embodiment as shown in FIG. 1 and FIG. 4, and the same technical effects may be achieved. To avoid repetition, a detailed description thereof is omitted herein. The computer readable storage medium may be a read-only memory (ROM), a random access memory (RAM), a magnetic disk, an optical disc or the like.

Embodiment 7

The present disclosure further provides, in some embodiments, an MCS selection method and a TBsize determination method.

The New Radio (NR) protocol defines, based on maximum modulation mode supported, two modulation and coding scheme (MCS) tables supporting 5 bits, one of which supports a maximum modulation mode of 64 quadrature amplitude modulation (QAM), and the other supports a maximum modulation mode of 256QAM. For UL discrete Fourier transformation OFDM (DFT-OFDM) waveforms, $\pi/2$ binary phase shift keying (BPSK) is listed as supported in the 64QAM MCS table.

In a NR system, if the UE and/or network device does not support $\pi/2$-BPSK or 64QAM, the UE and network device won't know how to determine the size of transport block (TB).

Thus, the present disclosure further provides, in some embodiments, a method of determining the size of TB, so as to avoid the problem that the UE and network device cannot determine the size of TB if the UE and/or network device does not support $\pi/2$-BPSK or 64QAM, thereby improving communication effectiveness.

In some embodiments of the present disclosure, the network device and UE may determine the size of TB (i.e., quantity of bits included in TB) according to at least one parameter of modulation order, code rate or spectral efficiency included in the MCS index indication information. Here, the modulation order and code rate refer to modulation order and code rate satisfying UE capability requirement or supported by network higher-layer configuration.

Optionally, in the determination of the modulation order (for ease of description, the modulation order is denoted as QM hereinafter), if the UE capability does not support $\pi/2$-BPSK, or the network higher-layer informs by signaling that $\pi/2$-BPSK is not supported, the modulation order may be re-determined with the formula: $Q_m = \max(2, Q_m')$, wherein $Q_m'$ is obtained from the MCS table configured by network. Here, the MCS table configured by network may be table 1 (MCS index for PUSCH with transform precoding and 64QAM) or table 2 (MCS index for 256QAM).

TABLE 1

| MCS index | Modulation order | Code rate × 1024 | Spectral efficiency |
|---|---|---|---|
| 0 | 1 | 240 | 0.2344 |
| 1 | 1 | 314 | 0.3066 |
| 2 | 2 | 193 | 0.3770 |
| 3 | 2 | 251 | 0.4902 |
| 4 | 2 | 308 | 0.6016 |
| 5 | 2 | 379 | 0.7402 |
| 6 | 2 | 449 | 0.8770 |
| 7 | 2 | 526 | 1.0273 |
| 8 | 2 | 602 | 1.1758 |
| 9 | 2 | 679 | 1.3262 |
| 10 | 4 | 340 | 1.3281 |
| 11 | 4 | 378 | 1.4766 |
| 12 | 4 | 434 | 1.6953 |
| 13 | 4 | 490 | 1.9141 |
| 14 | 4 | 553 | 2.1602 |
| 15 | 4 | 616 | 2.4063 |
| 16 | 4 | 658 | 2.5703 |
| 17 | 6 | 466 | 2.7305 |
| 18 | 6 | 517 | 3.0293 |

TABLE 1-continued

| MCS index | Modulation order | Code rate × 1024 | Spectral efficiency |
|---|---|---|---|
| 19 | 6 | 567 | 3.3223 |
| 20 | 6 | 616 | 3.6094 |
| 21 | 6 | 666 | 3.9023 |
| 22 | 6 | 719 | 4.2129 |
| 23 | 6 | 772 | 4.5234 |
| 24 | 6 | 822 | 4.8164 |
| 25 | 6 | 873 | 5.1152 |
| 26 | 6 | 910 | 5.3320 |
| 27 | 6 | 948 | 5.5547 |
| 28 | 1 | reserved | |
| 29 | 2 | reserved | |
| 30 | 4 | reserved | |
| 31 | 6 | reserved | |

TABLE 2

| MCS index | Modulation order | Code rate × 1024 | Spectral efficiency |
|---|---|---|---|
| 0 | 2 | 120 | 0.2344 |
| 1 | 2 | 193 | 0.3770 |
| 2 | 2 | 308 | 0.6016 |
| 3 | 2 | 449 | 0.8770 |
| 4 | 2 | 602 | 1.1758 |
| 5 | 4 | 378 | 1.4766 |
| 6 | 4 | 434 | 1.6953 |
| 7 | 4 | 490 | 1.9141 |
| 8 | 4 | 553 | 2.1602 |
| 9 | 4 | 616 | 2.4063 |
| 10 | 4 | 658 | 2.5703 |
| 11 | 6 | 466 | 2.7305 |
| 12 | 6 | 517 | 3.0293 |
| 13 | 6 | 567 | 3.3223 |
| 14 | 6 | 616 | 3.6094 |
| 15 | 6 | 666 | 3.9023 |
| 16 | 6 | 719 | 4.2129 |
| 17 | 6 | 772 | 4.5234 |
| 18 | 6 | 822 | 4.8164 |
| 19 | 6 | 873 | 5.1152 |
| 20 | 8 | 682.5 | 5.3320 |
| 21 | 8 | 711 | 5.5547 |
| 22 | 8 | 754 | 5.8906 |
| 23 | 8 | 797 | 6.2266 |
| 24 | 8 | 841 | 6.5703 |
| 25 | 8 | 885 | 6.9141 |
| 26 | 8 | 916.5 | 7.1602 |
| 27 | 8 | 948 | 7.4063 |
| 28 | 2 | reserved | |
| 29 | 4 | reserved | |
| 30 | 6 | reserved | |
| 31 | 8 | reserved | |

Optionally, when QM is re-determined with formula $Q_m = \max(2, Q_m')$ the code rate may be re-determined according to formula $$R = \frac{Q_m' * R'}{Q_m},$$

wherein $Q_m'$ and R' represent the modulation order and code rate obtained from the MCS table configured by network, respectively. Here, the MCS table configured by network may be, for example, table 1 or table 2.

Further, the quantity of bits included in transmitted information may be calculated based on formula $$N_{info} = N_{RE} * \frac{R}{1024} * Q_m * \upsilon.$$

If the calculated $N_{info}$ is not an integer, the final value of $N_{info}$ may be determined by rounding up or down.

Optionally, the quantity of bits included in transmitted information may also be calculated based on formula $N_{info} = N_{RE} * SE * \upsilon$, wherein SE denotes the spectral efficiency in the MCS table. If the calculated $N_{info}$ is not an integer, the final value of $N_{info}$ may be determined by rounding up or down.

A process of determining TB size employing the method according to some embodiments of the present disclosure is illustrated by way of example hereinafter.

In the first example, when the capability information reported by UE to the network indicates that the PUSCH of UE does not support π/2-BPSK and the current network configuration employs the foregoing table 1, if the selected MCS index is 0 or 1, the case corresponds to the following portion in table 1, referring to table 3.

TABLE 3

| MCS index | Modulation order | Code rate × 1024 | Spectral efficiency |
|---|---|---|---|
| 0 | 1 | 240 | 0.2344 |
| 1 | 1 | 314 | 0.3066 |

At this time, the modulation order may be re-determined according to $Q_m = \max(2, Q_m') = 2$, wherein $Q_m' = 1$.

When the MCS index is 0, $$R = \frac{Q_m' * R'}{Q_m} = 120,$$

wherein R'=240.

When the MCS index is 1, $$R = \frac{Q_m' * R'}{Q_m} = 157,$$

wherein R'=157.

TB size may be determined based on the re-determined $Q_m$ and R according to the following formula (1):

$$N_{info} = N_{RE} * \frac{R}{1024} * Q_m * \upsilon \quad (1)$$

Or, TB size may be determined according to the following formula (2):

$$N_{info} = N_{RE} * SE * \upsilon \quad (2)$$

wherein SE in the formula (2) denotes the spectral efficiency in the table 3. When the MCS index is 0, SE=0.2344; when the MCS index is 1, SE=0.3066.

In the second example, when the capability information reported by UE to the network indicates that the PUSCH of UE does not support 64QAM and the current MCS index may adopt 17, 18, 19 or 20, the case corresponds to the following portion of table 2, referring to table 4.

TABLE 4

| MCS index | Modulation order | Code rate × 1024 | Spectral efficiency |
|---|---|---|---|
| ... | ... | ... | ... |
| 16 | 4 | 658 | 2.5703 |
| 17 | 6 | 466 | 2.7305 |
| 18 | 6 | 517 | 3.0293 |
| 19 | 6 | 567 | 3.3223 |
| 20 | 6 | 616 | 3.6094 |
| 21 | 6 | 666 | 3.9023 |
| ... | ... | ... | ... |

Assuming that the current MCS index is 17, the modulation order may be re-determined according to $Q_m=\min(4, Q_m')=4$, wherein $Q_m'=6$. Further, it can be re-determined that $$R = \frac{Q_m' * R'}{Q_m} = 699.$$

TB size may be determined based on the re-determined $Q_m$ and R according to the formula (1) or formula (2).

It should be noted that the terms "include", "have", or any variation thereof used herein are intended to cover a non-exclusive inclusion, such that a process, a method, an article, or a device that includes a list of elements not only includes the list of elements, but also may include other elements not expressly listed or include elements inherent to the process, the method, the article, or the device. In case that there is no further limitation, an element preceded by "includes or including" does not preclude existence of additional identical elements in the process, the method, the article, or the device including the element.

From the foregoing description of the embodiments, a person skilled in the art will clearly appreciate that the method according to the embodiments may be implemented not only by software in conjunction with necessary generic hardware platform, but also by hardware, although the former will be preferred in most cases. Based on such an understanding, essential parts, or parts contributing to the related art, of the technical solution of the present disclosure may be implemented in form of a software product. The software product is stored in a storage medium (e.g., an ROM/RAM, a magnetic disk and an optical disc) and includes several instructions configured to be executed by a terminal (such as a handset, a computer, a server, an air conditioner or a network device) to perform the method according to the embodiments of the present disclosure.

The embodiments of the present disclosure are described above with reference to the accompanying drawings. However, the present disclosure is not limited to the foregoing specific implementations. The foregoing specific implementations are merely illustrative rather than limitative. In light of the teachings of the present disclosure, a person of ordinary skill in the art may further make various forms without departing from the spirit of the present disclosure and the scope of the claims, and these forms all fall within the scope of the present disclosure.

What is claimed is:

1. A method of transmitting a channel state information (CSI) report, applied to a user equipment (UE), comprising:
receiving a first indication on a second downlink (DL) frequency domain transmission resource, wherein the first indication is used to activate a first DL frequency domain transmission resource;
transmitting a CSI report on a first uplink (UL) frequency domain transmission resource according to a first CSI report configuration corresponding to the first DL frequency domain transmission resource when it is determined that there is the first CSI report configuration and it is determined that a CSI-reference signal (RS) corresponding to the first CSI report configuration is received on the first DL frequency domain transmission resource, wherein the first CSI report configuration comprises a periodicity characteristic of the CSI report; and
stopping transmitting a semi-persistent (SP) CSI report corresponding to the second DL frequency domain transmission resource when the SP CSI report is activated for the second DL frequency domain transmission resource and the second DL frequency domain transmission resource is switched to the first DL frequency domain transmission resource.

2. The method according to claim 1, further comprising:
receiving first configuration information, wherein the first configuration information comprises a CSI report configuration corresponding to at least one DL frequency domain transmission resource, the at least one DL frequency domain transmission resource comprises the first DL frequency domain transmission resource; or
receiving second configuration information, wherein the second configuration information comprises a CSI report configuration corresponding to all DL frequency domain transmission resources, wherein the all DL frequency domain transmission resources comprise the first DL frequency domain transmission resource.

3. The method according to claim 1, further comprising:
determining a latest CSI report configuration as the first CSI report configuration when it is determined that there are a plurality of CSI report configurations corresponding to the first DL frequency domain transmission resource and it is determined that a CSI-RS associated to the latest CSI report configuration is also received on the first DL frequency domain transmission resource.

4. The method according to claim 1, wherein the periodicity characteristic of the CSI report is semi-persistent,
the transmitting the CSI report on the first UL frequency domain transmission resource according to the first CSI report configuration comprises:
transmitting the CSI report on the first UL frequency domain transmission resource according to the first CSI report configuration when it is determined that the first DL frequency domain transmission resource is in an active state and a first activation indication is received, wherein the first activation indication is used to activate transmission of the CSI report according to a first CSI report configuration corresponding to the first DL frequency domain transmission resource, or is used to activate transmission of the CSI report according to a CSI report configuration corresponding to at least one DL frequency domain transmission resource.

5. The method according to claim 4, further comprising:
receiving the first activation indication on the second DL frequency domain transmission resource before reception of the first indication; or
receiving the first activation indication on the first DL frequency domain transmission resource after reception of the first indication.

6. The method according to claim 4, further comprising:
receiving a medium access control-control element (MAC CE), wherein the MAC CE comprises the first activation indication;
the transmitting the CSI report on the first UL frequency domain transmission resource according to the first CSI report configuration comprises:
transmitting the CSI report on the first UL frequency domain transmission resource according to the first CSI report configuration over a physical uplink control channel (PUCCH).

7. The method according to claim 4, further comprising:
receiving downlink control information (DCI), wherein the DCI comprises the first activation indication;
the transmitting the CSI report on the first UL frequency domain transmission resource according to the first CSI report configuration comprises:
transmitting the CSI report on the first UL frequency domain transmission resource according to the first CSI report configuration over a physical uplink shared channel (PUSCH).

8. The method according to claim 4, wherein the first indication carries the first activation indication.

9. The method according to claim 1, wherein the periodicity characteristic of the CSI report is semi-persistent, and the method further comprises:
stopping transmitting the CSI report according to a CSI report configuration corresponding to at least one DL frequency domain transmission resource when a deactivation indication is received, wherein the at least one DL frequency domain transmission resource comprises the first DL frequency domain transmission resource.

10. The method according to claim 1, wherein the DL frequency domain transmission resources comprise at least one of DL bandwidth part (BWP) and DL secondary cell; the UL frequency domain transmission resource comprises at least one of UL BWP and UL secondary cell.

11. A user equipment (UE), comprising: a memory, a processor and a computer program stored in the memory and configured to be executed by the processor, wherein the processor is configured to execute the computer program, to implement steps of the method according to claim 1.

12. A method of receiving a channel state information (CSI) report, applied to a network device, comprising:
transmitting a first indication on a second downlink (DL) frequency domain transmission resource, wherein the first indication is used to activate a first DL frequency domain transmission resource;
receiving a CSI report on a first uplink (UL) frequency domain transmission resource according to a first CSI report configuration corresponding to the first DL frequency domain transmission resource when it is determined that there is the first CSI report configuration and it is determined that a CSI-reference signal (RS) corresponding to the first CSI report configuration is transmitted on the first DL frequency domain transmission resource, wherein the first CSI report configuration comprises a periodicity characteristic of the CSI report; and
stopping receiving a semi-persistent (SP) CSI report corresponding to the second DL frequency domain transmission resource when the SP CSI report is activated for the second DL frequency domain transmission resource and the second DL frequency domain transmission resource is switched to the first DL frequency domain transmission resource.

13. The method according to claim 12, further comprising:
transmitting first configuration information, wherein the first configuration information comprises a CSI report configuration corresponding to at least one DL frequency domain transmission resource, wherein the at least one DL frequency domain transmission resource comprises the first DL frequency domain transmission resource; or
transmitting second configuration information, wherein the second configuration information comprises a CSI report configuration corresponding to all DL frequency domain transmission resources, wherein the all DL frequency domain transmission resources comprise the first DL frequency domain transmission resource.

14. The method according to claim 12, further comprising:
determining a latest CSI report configuration as the first CSI report configuration when it is determined that there are a plurality of CSI report configurations corresponding to the first DL frequency domain transmission resource and it is determined that a CSI-RS associated to the latest CSI report configuration is also transmitted on the first DL frequency domain transmission resource.

15. The method according to claim 12, wherein the periodicity characteristic of the CSI report is semi-persistent,
the receiving the CSI report on the first UL frequency domain transmission resource according to the first CSI report configuration comprises:
receiving the CSI report on the first UL frequency domain transmission resource according to the first CSI report configuration when it is determined that the first DL frequency domain transmission resource is in an active state and a first activation indication is transmitted,
wherein the first activation indication is used to activate reception of the CSI report according to a first CSI report configuration corresponding to the first DL frequency domain transmission resource, or is used to activate reception of the CSI report according to a CSI report configuration corresponding to at least one DL frequency domain transmission resource.

16. The method according to claim 15, further comprising:
transmitting the first activation indication on the second DL frequency domain transmission resource before transmission of the first indication; or transmitting the first activation indication on the first DL frequency domain transmission resource after transmission of the first indication.

17. The method according to claim 15, further comprising:
transmitting a medium access control-control element (MAC CE), wherein the MAC CE comprises the first activation indication;
the receiving the CSI report on the first UL frequency domain transmission resource according to the first CSI report configuration comprises:
receiving the CSI report on the first UL frequency domain transmission resource according to the first CSI report configuration over a physical uplink control channel (PUCCH).

18. The method according to claim 15, further comprising:

transmitting downlink control information (DCI), wherein the DCI comprises the first activation indication;

the receiving the CSI report on the first UL frequency domain transmission resource according to the first CSI report configuration comprises:

receiving the CSI report on the first UL frequency domain transmission resource according to the first CSI report configuration over a physical uplink shared channel (PUSCH).

19. The method according to claim 12, wherein the periodicity characteristic of the CSI report is semi-persistent, and the method further comprises:

when transmitting a deactivation indication, indicating to a user equipment (UE) that reception of the CSI report according to a CSI report configuration corresponding to at least one DL frequency domain transmission resource is stopped, wherein the at least one DL frequency domain transmission resource comprises the first DL frequency domain transmission resource.

20. A network device, comprising: a memory, a processor and a computer program stored in the memory and configured to be executed by the processor, wherein the processor is configured to execute the computer program, to implement steps of the method according to claim 12.

* * * * *